United States Patent [19]
Guyot et al.

[11] Patent Number: 5,343,488
[45] Date of Patent: Aug. 30, 1994

[54] INSTALLATION FOR THE FORMATION OF A LASER BEAM SUITABLE FOR ISOTOPE SEPARATION

[75] Inventors: Jean Guyot, Cernay la Ville; Etienne Pochon, Clamart, both of France

[73] Assignee: Commissariat a l'Energie Atomique, Paris, France

[21] Appl. No.: 960,798

[22] Filed: Oct. 14, 1992

[30] Foreign Application Priority Data

Oct. 18, 1991 [FR] France ................... 91 12894

[51] Int. Cl.⁵ .................................. H01S 3/09
[52] U.S. Cl. ............................ 372/69; 372/53; 372/70
[58] Field of Search .............. 372/69, 70, 53, 10

[56] References Cited

U.S. PATENT DOCUMENTS 4,951,287  8/1990  Wyeth et al. ................. 372/32

OTHER PUBLICATIONS

Applied Optics, vol. 18, No. 4, Feb. 15, 1979, pp. 525–527, S. Lavi, et al., "Efficient Oscillator-Amplifier Dye Laser Pumped by a Frequency-Doubled Nd:Yag Laser".

Patent Abstracts of Japan, vol. 11, No. 182 (E-515) (2629), Jun. 11, 1987, & JP-62-14487, Jan. 23, 1987, Yoshihiro Kobayashi, "Laser Apparatus".

Applied Physics Letters, vol. 54, No. 6, Feb. 6, 1989, pp. 496–498, B. Zysset, et al., "High Repetition Ratge Femtosecond Dye Amplifier Using a Laser Diode Pumped Neodymium: Yag Laser".

Patent Abstracts of Japan, vol. 11, No. 343 (E-555) (2790), Nov. 10, 1987, & JP-62-124784, Jun. 6, 1987, Toshio Sato, et al., "Dyestuff Laser Device".

*Primary Examiner*—Rodney B. Bovernick
*Assistant Examiner*—Robert E. Wise
*Attorney, Agent, or Firm*—Oblon, Spivak, McClelland, Maier & Neustadt

[57] ABSTRACT

An installation for the formation of a laser beam suitable for isotope separation. According to the present invention, a pumping means of tunable chains are constituted by a plurality of solid matrix lasers, e.g., of the frequency-doubled, switched YAG type, having optical fibers guiding the pumping light to the tunable chain. Such a system finds particular application to isotope separation.

7 Claims, 3 Drawing Sheets

INSTALLATION FOR THE FORMATION OF A LASER BEAM SUITABLE FOR ISOTOPE SEPARATION

BACKGROUND OF THE INVENTION

1. Field of the Invention

The present invention relates to an installation for the formation of a laser beam suitable for isotope separation in an atomic vapor (SILVA process).

2. Discussion of the Background

Isotope separation by laser in an atomic vapor is based on the selective photoionization of uranium 235 atoms by resonant absorption. This process requires the production of a laser beam having special properties. It must firstly be polychromatic, i.e. formed from three or four colors, in order to permit the excitation of the various transitions involved in the photoionization process. It must also be wavelength tunable between approximately 550 and 700 nm, to permit the adjustment of the various wavelengths to the transitions involved. It must have a good spectral fineness close to $10^{-6}$. It must supply pulses with a duration of approximately 50 ns with a repetition rate of approximately 10 kHz. Finally, its average power must be a few dozen Watts for laboratory installations and must be able to reach 25 kW for an industrial installation.

In order to achieve such performance characteristics, installations have been constructed having several dye laser chains (i.e. tunable lasers), operating at different wavelengths. Each chain comprises an oscillator stage and an amplifier stage connected in series. Each of the stages of said chains is optically pumped by a chain of lasers arranged in series, each of the pumping lasers operating at a high average power (several hundred Watts). Each pumping chain supplies a bean, whose average power is approximately 1 kW.

The various beans emitted by the different pumping chains are directed by appropriate optical elements (mirrors, lenses, etc.) towards the stages of the dye lasers. The lasers forming the pumping chains are generally copper vapor lasers, which emit two lines respectively at 510 and 578 nm with a repetition rate of approximately 5 kHz.

FIG. 1 shows an installation according to this prior art. The dye laser chain comprises an oscillator stage 10 and amplifier stages 12, 14, 16. There are the sane number of chains of this type as there are wavelengths to be produced (e.g. four).

In the illustrated example, the pumping chain comprises four chains A, B, C and D, each constituted by an oscillator 20 and three amplifiers 22, 24, 26. The four beans 30, 32, 34, 36 supplied are controlled and multiplexed in a system 40 and are then transported by a set of mirrors and lenses and are finally supplied to two bean distribution systems 44 and 46 positioned on either side of the dye laser chain.

It is not appropriate here to describe the wavelength multiplexing means of the beans finally supplied by the various dye laser chains or the separator where the selective photoionization of the uranium 235 finally takes place, because these means are well known and do not form part of the invention. A description is provided in the work entitled "Le Laser-Principes et techniques d'application", coordinator H. MAILLET, chapter 4: "Séparation isotopique par laser" by M. CLERC, P. RIGNY and O. DE WITTE (Edition Lavoisier).

Although satisfactory in certain respects, these installations suffer from disadvantages.

Firstly, they have considerable overall dimensions as a result of the use of copper vapor lasers, which are several meters long and have voluminous electrical supply circuits. This is in particular due to the fact that these lasers use a low pressure gas as the active medium. They also require numerous optical elements (mirrors, lenses, etc.) in order to control, multiplex and direct the different light beans emitted by the pumping chains to the dye chains. Therefore, numerous mechanical constraints appear for ensuring the correct focusing of the pumping beans in the dye lasers. These mechanical constraints are made worse by the fact that the two subsystems, namely that of the dye chain (at the top of FIG. 1) and that of the pumping chain (at the bottom of FIG. 1) are in practice very remote from one another and are usually positioned in separate rooms or even buildings, due to the widely differing technologies involved.

Finally, the increase of the average power, which is always desirable when it is wished to achieve industrial dimensions, causes serious problems as a result of the power limiting phenomena occurring in pumping chains, linked with the performance characteristics of the optics (in-line losses and flux resistance threshold) and the saturation of the medium.

SUMMARY OF THE INVENTION

The present invention aims at obviating the aforementioned disadvantages. To this end, it proposes an installation making a break with traditional architecture and whilst proposing a different architecture eliminating any mechanical problem between the pumping chains and the dye chains, which significantly reduces the number of optical elements involved, which leads to a greater compactness, a better efficiency and higher reliability and which finally reduces the costs per Watt produced.

All these results are achieved by substituting the prior art pumping chains by a plurality of solid matrix lasers, all of which operate in parallel. For the envisaged isotope separation application, these lasers operate with pulses lasting less than 100 ns, at a repetition rate between a few kilohertz and a few dozen kilohertz, at a wavelength in the visible range and at an average power of a few dozen to a hundred or so Watts. Optical fibers are also provided for guiding the light emitted by said lasers to the different stages of the dye laser chain or chains, so that each stage is pumped by light from different solid matrix lasers.

Therefore such an installation makes a break with the prior art not only through the replacement of the copper vapor gas lasers by solid lasers, but more particularly by the replacement of a series-type architecture by a parallel-type architecture.

Moreover, it permits the use of low average power laser sources (a few dozen Watts) for optically pumping high average power dye laser chains (approximately 1 kW).

Moreover, as a result of the invention, all the pumping lasers become identical, which gives them a modular character, whereas in the prior art there were different oscillator lasers and amplifier stages.

The aforementioned advantages are indeed obtained. Firstly, due to their compactness, solid lasers can be positioned in the immediate vicinity of dye lasers, whose pumping they ensure. Moreover, the use of optical fibers eliminates any optical element of the mirror or lens type. In addition, the low average power emitted by solid lasers is perfectly compatible with optical fiber propagation. These fibers can have a diameter of 400 to 1000 μm. Finally, the modular character of pumping lasers authorizes mass production suitable for cost reduction purposes.

In order to illustrate the reduction of costs resulting from the larger quantities to be produced, it is pointed out that an isotope separation plant operating with a tunable optical power of 25 kW requires a pumping power of 150 to 250 kW. With copper vapor lasers having a unitary power of 500 W, there would have to be 300 to 500 copper vapor laser modules. With the architecture according to the invention using solid lasers supplying an average power of 30 to 50 W, it would be necessary to have approximately 5000 modules, i.e. 10 times more.

Preferably, each solid matrix laser is a neodymium-doped YAG-type laser, provided with emission frequency doubling means. The latter can be constituted by a doubler crystal placed in the laser cavity and in particular a KTP crystal. The emission wavelength is then 530 nm. Neodymium-doped YAG lasers can be pumped by a discharge lamp or by laser diodes operating in a continuous or pulse-type manner.

Preferably, each neodymium-doped YAG laser comprises a Q-switch. It can be an acoustooptical or electro-optical modulator. These means make it possible to obtain pubes with a duration less than 100 ns.

DETAILED DESCRIPTION OF THE PREFERRED EMBODIMENT

Figure 1:
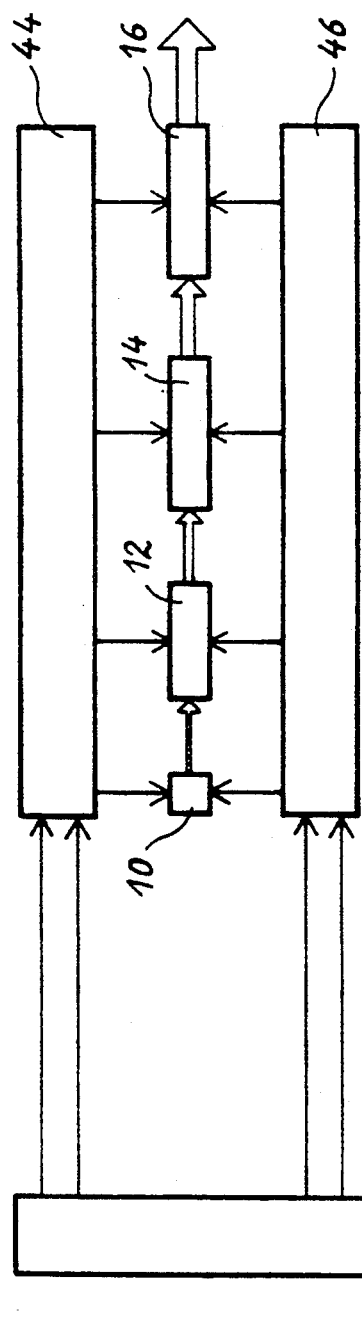
FIG. 1, already described, illustrates a prior art installation.
Figure 1:
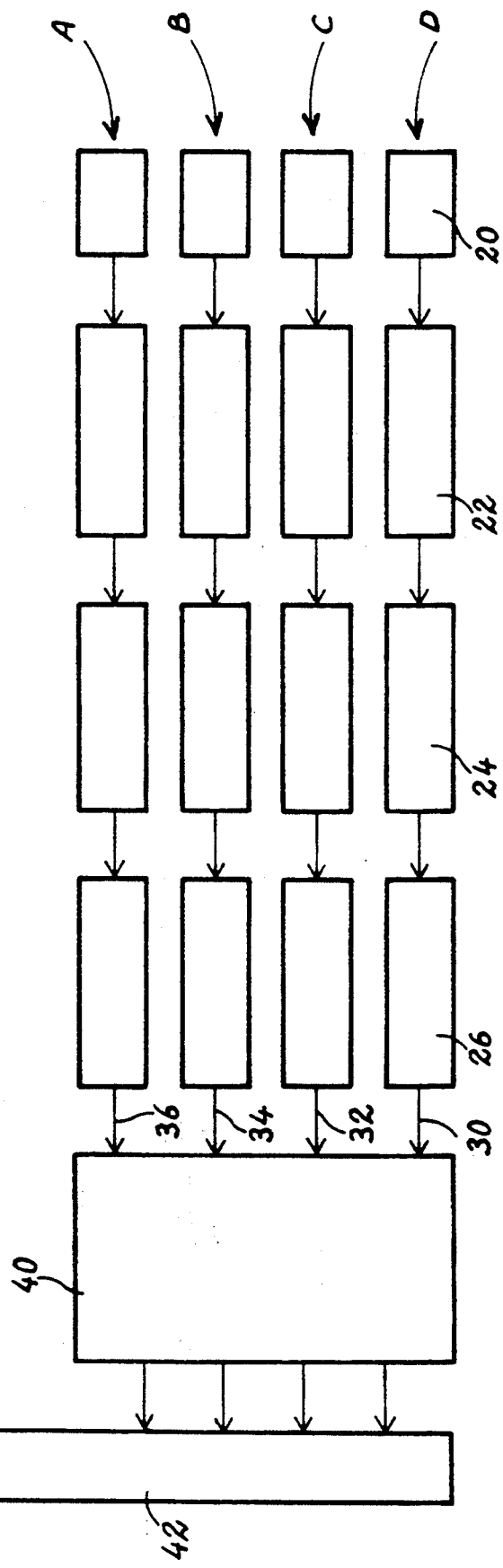
Figure 2:
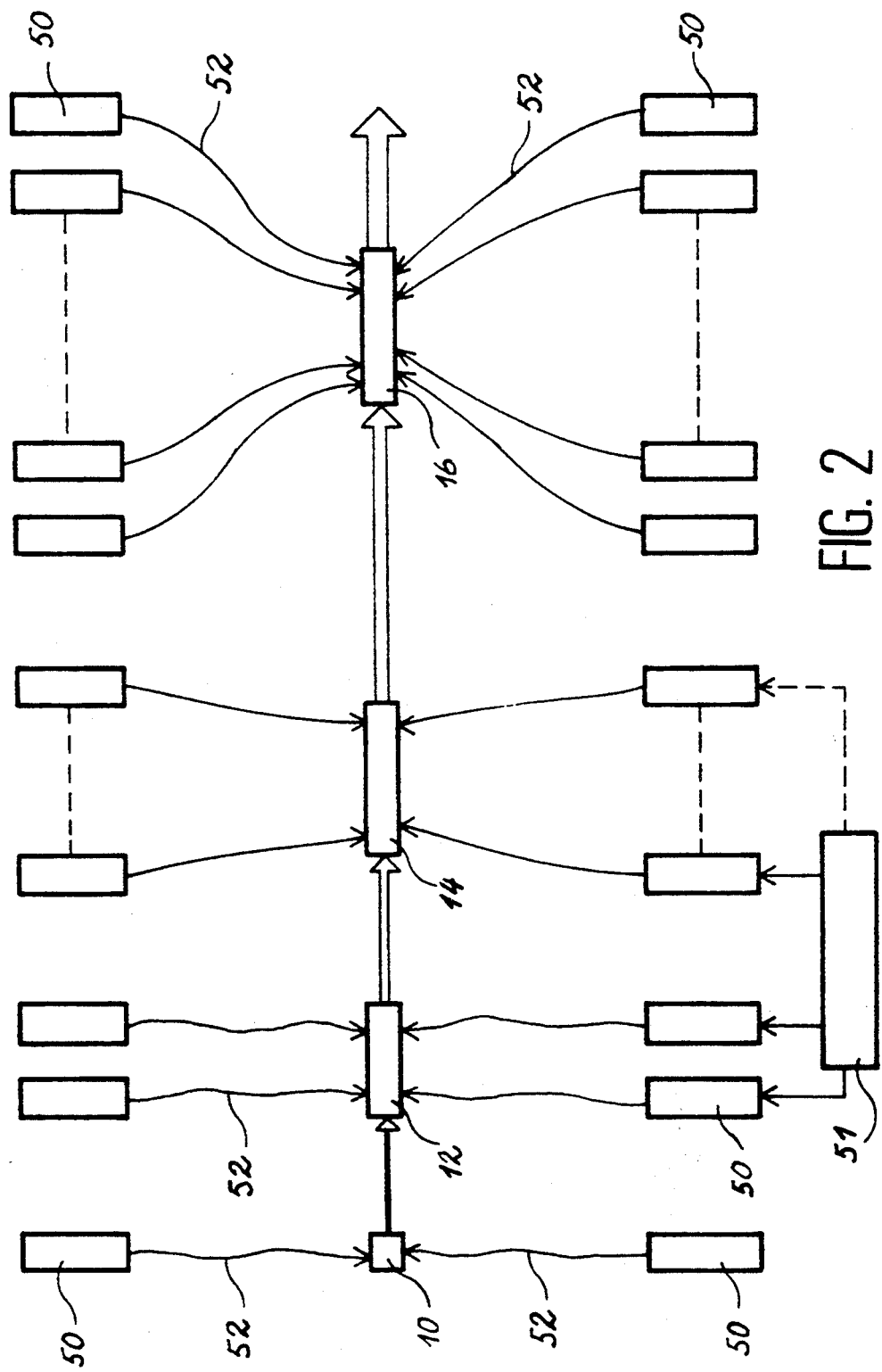
FIG. 2 diagrammatically shows an installation according to the invention.

FIG. 2 shows an installation according to the invention. As shown, said installation comprises, as in the prior art, various tunable laser chains, which are in practice dye lasers. Only one chain is shown in FIG. 2 with an oscillator stage 10 and amplifier stages 12, 14, 16.

According to the invention each of these oscillator or amplifier stages is pumped by several solid matrix lasers 50, e.g. switched, frequency-doubled, neodymium-doped n-doped YAG lasers. The control means for these solid matrix lasers are symbolized by the block 51. The output of each of the solid matrix lasers 50 is coupled to an optical fiber, which guides the light beam emitted to the stage to be pumped.

Figure 3:
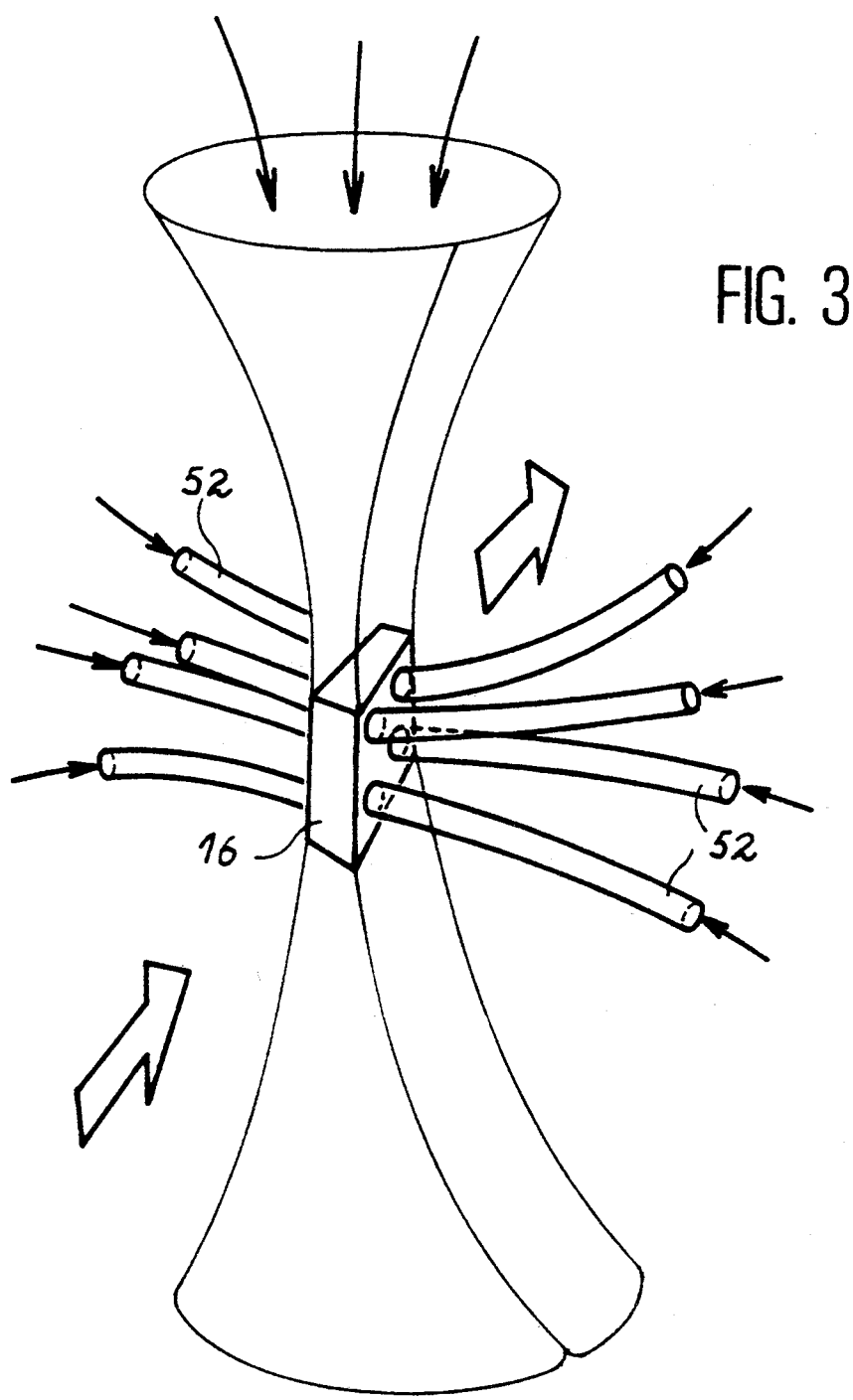
FIG. 3 shows a detail of a dye stream pumped by optical fibers.

Preferably, these optical fibers are subdivided into two groups issuing on either side of the liquid stream or jet to be pumped, as can best be seen in FIG. 3. The latter only shows for clarity reasons four optical fibers 52 on each side of a stream 16 to be pumped, but in practice there can be far more. The number of optical fibers associated with a stage increases on descending in the dye laser chain from the oscillator 10.

When the repetition frequency of the wavelength-tunable pulses must be very high and when solid lasers are unable to supply pumping pulses at such a frequency, the solid lasers corresponding to the same stream to be pumped are switched in a multiplexed manner (by delaying the time of their switching). The light pulses supplied by these lasers are then time-multiplexed. For example, four switched YAG lasers operating in each case at 5 kHz can produce a 20 kHz pulse train, if they are reciprocally triggered with a lag of 50 μs.

Figure 4:
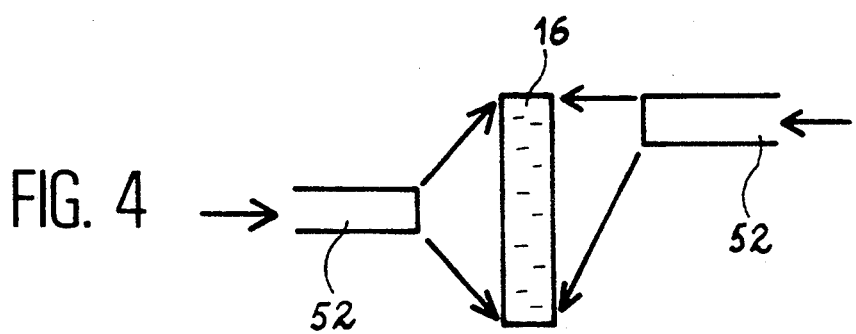
FIG. 4 shows a detail of the optical coupling between the fibers and the liquid stream to be pumped.

Each fiber must then be optically coupled to all the stream to be pumped. This is the case shown in FIG. 4, where it is possible to see a stream 16 in plan view and two fibers 52, one located on the edge of the stream and the other in the center, both illuminating the entire stream. This coupling is obtained by providing the end of the fibers with suitable lenses.

We claim:

1. An installation for the formation of a laser beam suitable for isotope separation in an atomic vapor, comprising:

at least one dye laser chain comprising an oscillator stage and at least one amplifier stage arranged in series;

an optical pumping means for said at least one dye laser chain, comprising a plurality of solid matrix lasers, all operating in parallel, for outputting pulses lasting less than 100 ns, at a wavelength in the visible range;

optical fibers for guiding the pulses emitted by said plurality of solid matrix lasers to the oscillator stage and at least one amplifier stage of the dye laser chain, each oscillator stage and amplifier stage thus being pumped by the pulses output from the plurality of solid matrix lasers.

2. The installation according to claim 1, wherein each solid matrix laser is a neodymium-doped YAG-type laser provided with means for doubling the emission frequency.

3. The installation according to claim 2, wherein each neodymium-doped YAG laser is pumped by a discharge lamp.

4. The installation according to claim 2, wherein each neodymium-doped YAG laser is pumped by laser diodes.

5. The installation according to claim 2, wherein each neodymium-doped YAG laser comprises Q-switches.

6. The installation according to claim 1, further comprising means for the time multiplexing of the light pulses emitted by the solid matrix lasers.

7. The installation according to claim 6, wherein the means for the time multiplexing of the light pulses are means able to time-delay switching times of the plurality of solid matrix lasers.

* * * * *